United States Patent
Pike et al.

(10) Patent No.: US 10,832,251 B1
(45) Date of Patent: Nov. 10, 2020

(54) BEHAVIORAL ANALYSIS FOR SMART AGENTS

(71) Applicant: Wells Fargo Bank, N.A., San Francisco, CA (US)

(72) Inventors: Glenn W. Pike, Tempe, AZ (US); Christian L. Hunt, Gilbert, AZ (US); Scott R. Kinney, Phoenix, AZ (US); Steven M. Trudeau, Advance, NC (US); Stephen W. Krause, Fountain Hills, AZ (US); Jason Avery, Chandler, AZ (US)

(73) Assignee: Wells Fargo Bank, N.A, San Francisco, CA (US)

( * ) Notice: Subject to any disclaimer, the term of this patent is extended or adjusted under 35 U.S.C. 154(b) by 318 days.

(21) Appl. No.: 15/724,765

(22) Filed: Oct. 4, 2017

(51) Int. Cl.
   *G06Q 40/00* (2012.01)
   *G06Q 20/40* (2012.01)

(52) U.S. Cl.
   CPC .................. *G06Q 20/405* (2013.01)

(58) Field of Classification Search
   CPC .............. G06Q 40/00; G06Q 20/405
   See application file for complete search history.

(56) References Cited

U.S. PATENT DOCUMENTS

| | | | |
|---|---|---|---|
| 6,757,362 B1 | 6/2004 | Cooper et al. | |
| 7,415,100 B2 | 8/2008 | Cooper et al. | |
| 7,920,678 B2 | 4/2011 | Cooper et al. | |
| 8,000,453 B2 | 8/2011 | Cooper et al. | |
| 8,284,985 B2 | 10/2012 | Charpentier | |
| 9,008,283 B2 | 4/2015 | Riahi et al. | |
| 9,085,303 B2 | 7/2015 | Wolverton et al. | |
| 9,143,614 B2 | 9/2015 | Williams | |
| 9,215,244 B2 | 12/2015 | Ayyagari et al. | |
| 9,451,088 B2 | 9/2016 | Williams et al. | |

(Continued)

OTHER PUBLICATIONS

A trace-based approach to identifying users' engagement and qualifying their engaged-behaviours in interactive systems: application to a social game Bouvier, Patrice; Sehaba, Karim; Lavoué, Élise. User Modeling and User-Adapted Interaction; Dordrecht vol. 24, Iss. 5, (Dec. 2014): 413-451. (Year: 2014).*

*Primary Examiner* — Lalita M Hamilton
(74) *Attorney, Agent, or Firm* — Walter Haverfield LLP; James J. Pingor

(57) ABSTRACT

A system and computer-readable storage medium perform a method for contextual inferring capacity for triggering a financial transaction by monitoring, via user device(s), objective contextual data of location, temporal, and volitional transaction information associated with an authorized user of a financial system. Subjective contextual data of personal calendar events, physiological data, and pacing of user interactions with the user device(s) is monitored. The objective and subjective contextual data is analyzed to create scenario(s) correlated with performing a volitional transaction. If not predictive a volitional transaction, a layer of security protocol is added for authentication prior to executing the volitional transaction. In response to determining that the current context is predictive of a volitional transaction, a determination is made whether the subjective contextual data satisfies criterion for incapacity to perform a volitional transaction. In response to determining incapacity to perform the volitional transaction, access to the financial system is limited.

20 Claims, 6 Drawing Sheets

(56) References Cited

U.S. PATENT DOCUMENTS

| | | |
|---|---|---|
| 2002/0029203 A1 | 3/2002 | Pelland et al. |
| 2005/0183143 A1* | 8/2005 | Anderholm ............. G06F 11/32 |
| | | 726/22 |
| 2008/0091663 A1* | 4/2008 | Inala .................... H04L 67/306 |
| 2008/0096533 A1 | 4/2008 | Manfredi et al. |
| 2014/0100835 A1 | 4/2014 | Majumdar et al. |
| 2014/0365226 A1 | 12/2014 | Sinha |
| 2015/0066817 A1 | 3/2015 | Slayton et al. |
| 2015/0067503 A1 | 3/2015 | Slayton et al. |
| 2015/0213800 A1 | 7/2015 | Krishnan et al. |
| 2015/0215350 A1 | 7/2015 | Slayton et al. |
| 2015/0339376 A1 | 11/2015 | Wieweg et al. |

* cited by examiner

BEHAVIORAL ANALYSIS FOR SMART AGENTS

BACKGROUND

The present application relates to systems and methods for authenticating and characterizing a human operator prior to facilitating financial transactions.

Smart agents as used by smartphones or other devices (e.g., Amazon Alexa, Google Now, iPhone's Siri) respond to specific requests for information, and may remind users about upcoming items on that user's calendar. More sophisticated smart agents are starting to make attempts to predict information that a user might need. For example, when an email is received including flight information, information about the flight might be presented to the user on the day of the flight. Smart agents apparently do not, however, understand emotions or context when performing actions on behalf of users.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

In one or more embodiments, the present disclosure provides a method for contextual inferring capacity for triggering a financial transaction. In one or more embodiments, the method includes monitoring, via one or more user devices, objective contextual data comprising more than one of: (i) location information; (ii) temporal information; and (iii) volitional transaction information associated with an authorized user of a financial system. The method includes monitoring, via one or more user devices, subjective contextual data comprising more than one of: (i) personal calendar events; (ii) physiological data; and (iii) pacing of user interactions with the one or more user devices. The method includes analyzing the objective and subjective contextual data to create one or more scenarios that are correlated with performing a volitional transaction. The method includes determining whether a current context is one of the one or more scenarios that is correlated with and predictive of the volitional transactional information. In response to determining that the current context is not predictive a volitional transaction, the method adding a layer of security protocol for user authentication prior to executing the volitional transaction. In response to determining that the current context is predictive of a volitional transaction, the method includes determining whether the subjective contextual data satisfies at least one criterion for incapacity to perform a volitional transaction. In response to determining an incapacity to perform the volitional transaction, the method includes limiting access to the financial system.

In one or more embodiments, the present disclosure provides a system including an objective contextual monitoring component that is in communication with a one or more user devices. The object contextual monitoring component receives objective contextual data comprising more than one of: (i) location information; (ii) temporal information; and (iii) volitional transaction information associated with an authorized user of a financial system. A subjective contextual monitoring component is in communication with the one or more user devices. The subjective contextual monitoring component receives subjective contextual data comprising more than one of: (i) personal calendar events; (ii) physiological data; and (iii) pacing of user interactions with the one or more user devices. A contextual analyzing component receives the objective and subjective contextual data to create one or more scenarios that are correlated with performing a volitional transaction. A predictive engine determines whether a current context is one of the one or more scenarios that is correlated with and predictive of the volitional transactional information. A financial transaction controller, in response to determining that the current context is not predictive a volitional transaction, adds a layer of security protocol for user authentication prior to executing the volitional transaction. In response to determining that the current context is predictive of a volitional transaction, the financial transaction controller determines whether the subjective contextual data satisfies at least one criterion for incapacity to perform a volitional transaction. In response to determining an incapacity to perform the volitional transaction, the financial transaction controller limits access to the financial system.

In one or more embodiments, the present disclosure provides a computer-readable storage medium includes computer-executable instructions. When executed via a processing unit on a computer, the computer-readable storage medium performs acts including monitoring, via one or more user devices, objective contextual data comprising more than one of: (i) location information; (ii) temporal information; and (iii) volitional transaction information associated with an authorized user of a financial system. The computer-readable storage medium monitors, via one or more user devices, subjective contextual data comprising more than one of: (i) personal calendar events; (ii) physiological data; and (iii) pacing of user interactions with the one or more user devices. The computer-readable storage medium analyzes the objective and subjective contextual data to create one or more scenarios that are correlated with performing a volitional transaction. The computer-readable storage medium determines whether a current context is one of the one or more scenarios that is correlated with and predictive of the volitional transactional information. In response to determining that the current context is not predictive a volitional transaction, the computer-readable storage medium adds a layer of security protocol for user authentication prior to executing the volitional transaction. In response to determining that the current context is predictive of a volitional transaction, the computer-readable storage medium determines whether the subjective contextual data satisfies at least one criterion for incapacity to perform a volitional transaction. In response to determining an incapacity to perform the volitional transaction, the computer-readable storage medium limits access to the financial system.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not

DETAILED DESCRIPTION

Figure 1:
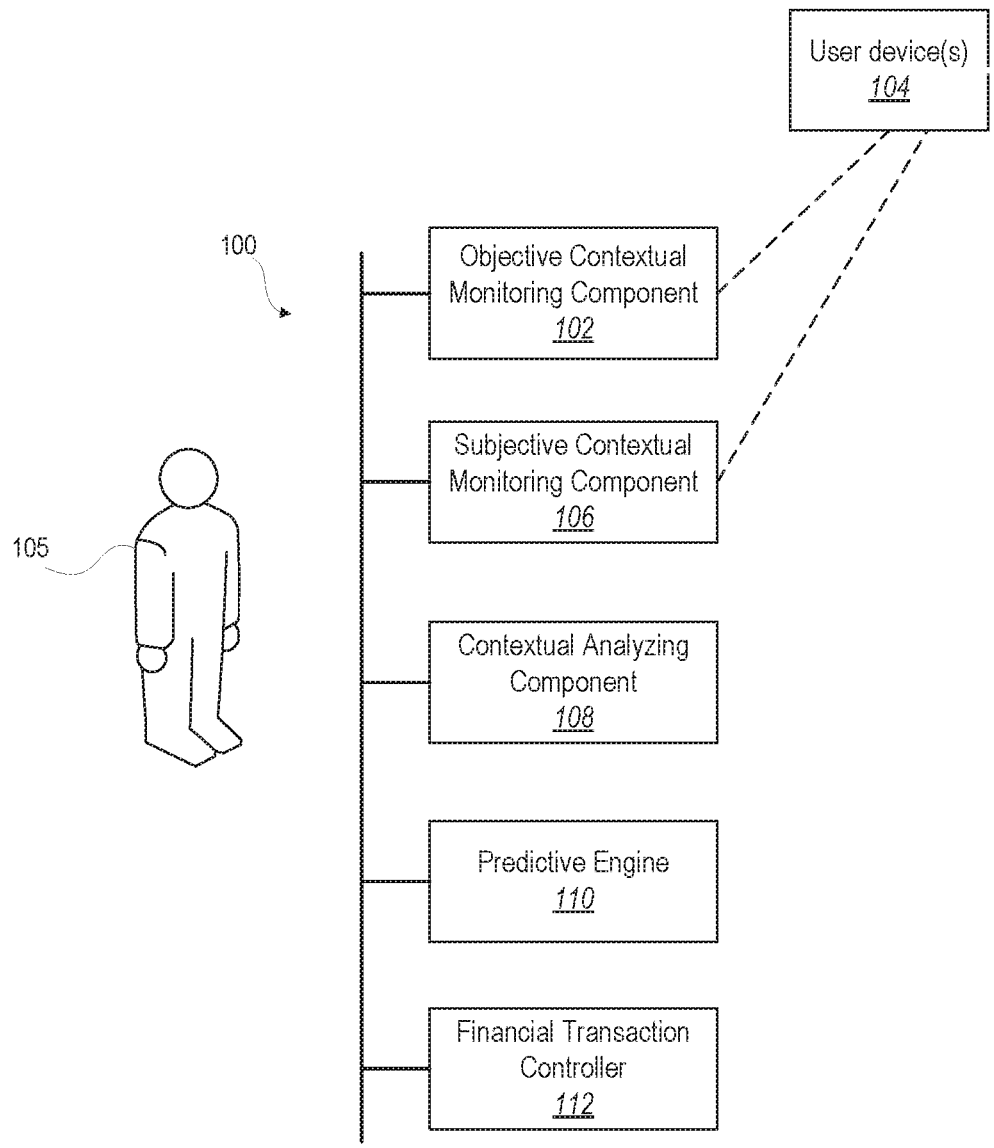
FIG. 1 illustrates a block diagram of a system for contextual authentication and transaction control, according to one or more embodiments.

A system and computer-readable storage medium perform a method for contextual inferring capacity for triggering a financial transaction by monitoring, via user device(s), objective contextual data of location, temporal, and volitional transaction information associated with an authorized user of a financial system. Subjective contextual data of personal calendar events, physiological data, and pacing of user interactions with the user device(s) is monitored. The objective and subjective contextual data is analyzed to create scenario(s) correlated with performing a volitional transaction. If not predictive a volitional transaction, a layer of security protocol is added for authentication prior to executing the volitional transaction. In response to determining that the current context is predictive of a volitional transaction, a determination is made whether the subjective contextual data satisfies criterion for incapacity to perform a volitional transaction. In response to determining incapacity to perform the volitional transaction, access to the financial system is limited.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Turning to the Drawings, FIG. 1 illustrates a system 100 has an objective contextual monitoring component 102 that is in communication with a one or more user devices 104 associated with an authorized user 105. The objective contextual monitoring component 102 receives objective contextual data comprising more than one of: (i) location information; (ii) temporal information; and (iii) volitional transaction information associated with an authorized user of a financial system. A subjective contextual monitoring component 106 is in communication with the one or more user devices 104 to receive subjective contextual data comprising more than one of: (i) personal calendar events; (ii) physiological data; and (iii) pacing of user interactions with the one or more user devices. A contextual analyzing component 108 receives the objective and subjective contextual data and create scenario(s) that are correlated with performing a volitional transaction. A predictive engine 110 determines whether a current context is one of the scenario(s) that is correlated with and predictive of the volitional transactional information. A financial transaction controller 112 acts on predictive analyses. In response to determining that the current context is not predictive a volitional transaction, the financial transaction controller 112 adds a layer of security protocol for user authentication prior to executing the volitional transaction. In response to determining that the current context is predictive of a volitional transaction, the financial transaction controller 112 determines whether the subjective contextual data satisfies at least one criterion for incapacity to perform a volitional transaction. In response to determining an incapacity to perform the volitional transaction, the financial transaction controller 112 limits access to the financial system.

Figure 2:
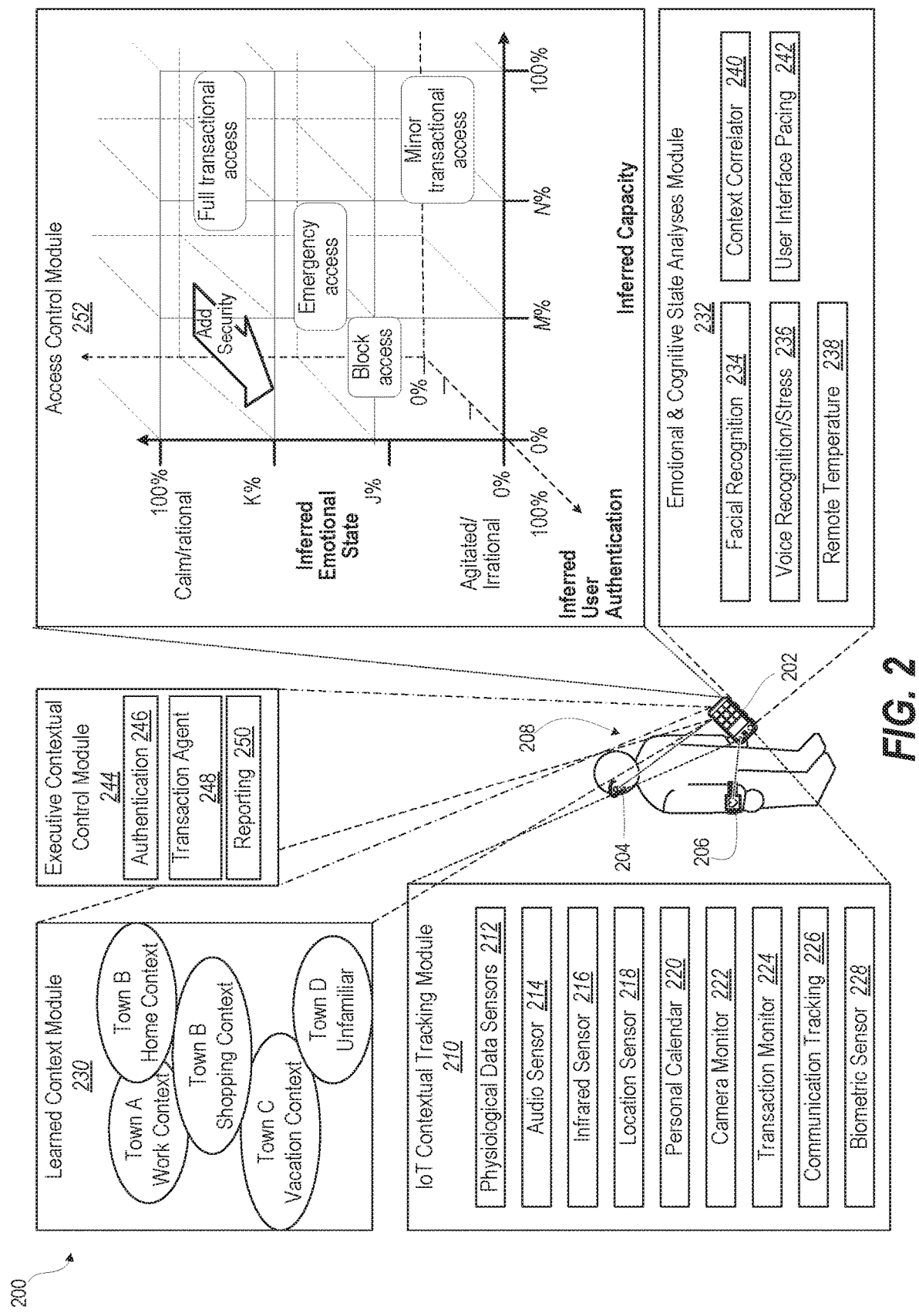
FIG. 2 illustrates a block diagram of a communication system for contextual authentication and control of financial transactions, according to one or more embodiments.

In one or more embodiments, FIG. 2 illustrates a system 200 executed at least in part by one or more user devices, illustrated as a smartphone 202, blue tooth earpiece 204, and smart watch 206 that form a personal access network (PAN) 208. A number of Internet of Things (IoT) devices can provide information to an IoT contextual tracking module 210. For example, the smartphone 202 can contain or be in communication one or more of the following sources of contextual information: (i) physiological data sensors 212; (ii) audio sensor 214; (iii) infrared sensor 216; (iv) location sensor 218; (v) personal calendar 220; (vi) camera monitor 222; (vii) transaction monitor 224; (viii) communication tracking 226; and (ix) biometric sensor 228.

Based on the information collected by the IoT contextual tracking module 210, a number of learned contexts can be amassed by a learned context module 230, such as a "Town A work context", "Town B home context", and "Town B shopping context", "Town C vacation context" 230 can have certain contexts that are too incomplete for doing predictive analyses, represented by "Town D Unfamiliar" context.

Subjective aspects of a historical or current context can be determined by an emotional and cognitive state analysis module 232. Examples of constituent capabilities of module 232 are illustrated as a facial recognition component 234, a voice recognition/stress analyzer component 236, a remote temperature sensor 238, a context correlator 240, and a user interface pacing component 242.

An executive contextual control module 244 can act upon the objective and subjective contextual information to trigger an authentication component 246, a transaction agent 248, and a report component 250 as needed. For example, the executive contextual control module 244 can determine that a current contextual scenario fall within a multidimensional space defined within an access control module 252. For example, the contextual response can be a function of an inferred user authentication value, an inferred emotional state value and an inferred cognitive capacity value. For example, when fully authenticated with high values of cognitive and emotional state, full transactional access can be granted. When not authenticated, additional layers of security can be imposed. When in a reduced capacity, transactions can be limited, such as authorizing transportation for an inebriated user but not authorizing large banking transactions. When in an agitated state, the system can be discrete in what types of financial transactions or advertisements are offered to not exacerbate the situation.

Figure 3:
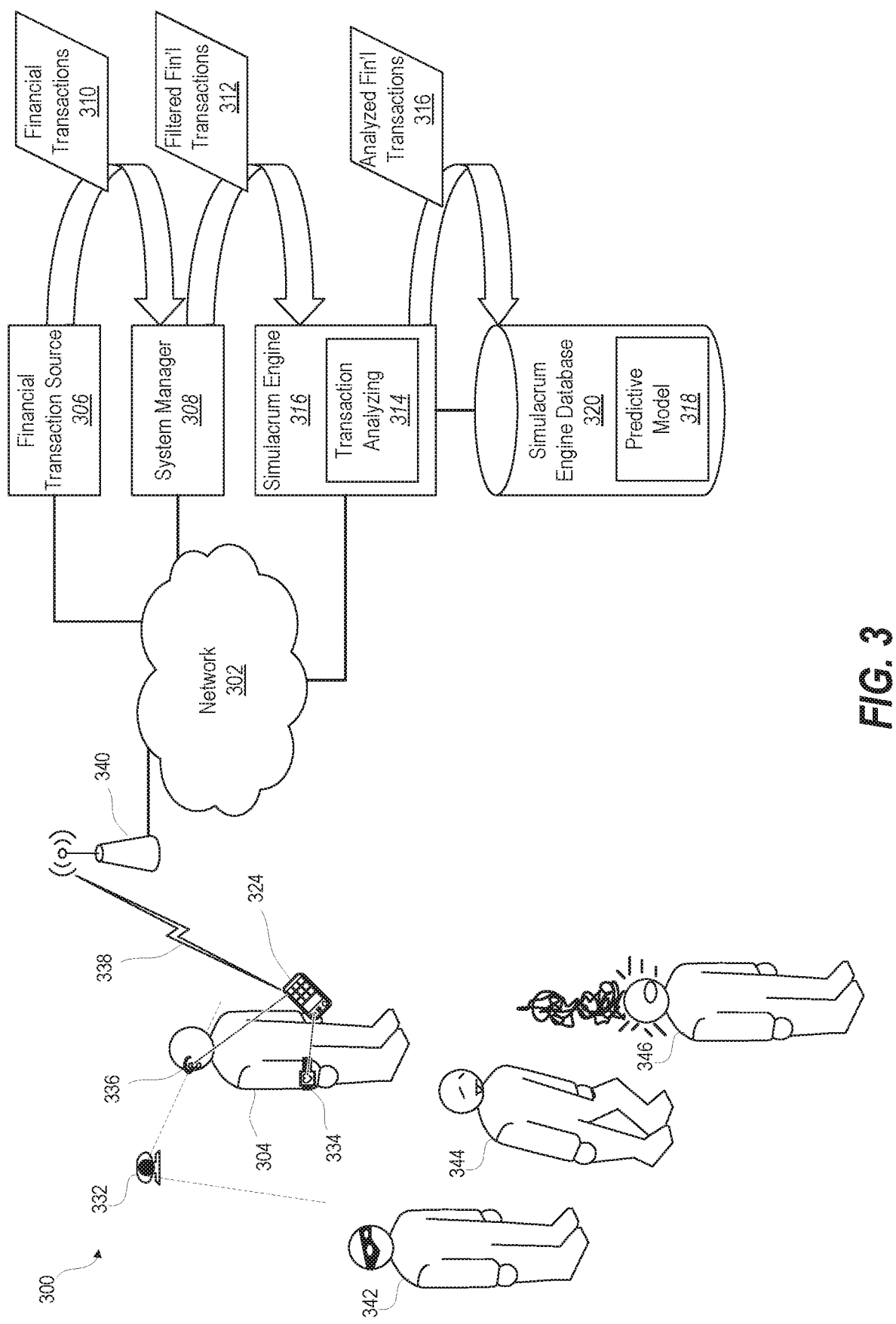
FIG. 3 illustrates a block diagram of a communication system for detecting a fully capable, authenticated user, an imposter user, an incapacitated user, and an emotionally agitated user, according to one or more embodiments.

In one or more embodiments, FIG. 3 illustrates a communication system 300 having a network 302 that couples sources of data and processing capabilities to perform contextual collection, analysis and prediction of a user 304. One or more financial transaction sources 306 provide past or current financial transactions, either open for completion by a human operator 304 or previously completed. A system manager 308 can obtain relevant financial transactions 310 from the financial transactions sources 306 and provide filtered financial transactions 312 to the transaction analyzing component 314 of a simulacrum engine 316. The simulacrum engine 316 can create and maintain a predictive model 318 for the human operator 304 that is combined with contextual information. The predictive model 318 is contained in a simulacrum engine database 320. Mobile application 322 executed on a user device 324 can provide a user interface 326 for providing recommendations 328 for and for receiving activation of control affordances 330 from the human operator 304 and for collecting objective and subjective contextual data. The user device 324 itself can contain sensors and communication channels that enable monitoring of a capacity status of the human operator 304. For clarity, external sources of information regarding the health, location, activity level, cognitive interactions, etc., by the human operator 206 are illustrated as a camera 332, a smart watch 334, and a blue tooth device 336, or other Internet of Things (IoT) devices. Thus, an ability is provided to capture health and mobility levels of the human operator. This ability could leverage other devices used to monitor an individual's health in general (e.g., activity trackers, heart rate monitors). The mobile application 322 can communicate via a communication channel 338 to a node 340 that in turn is communicatively coupled to the network 302. Based on this information, the system 300 can differentiate situations such as full capable user 304, an imposter 342, an incapacitated user 344, and an enraged, irrational user 346.

Figure 4:
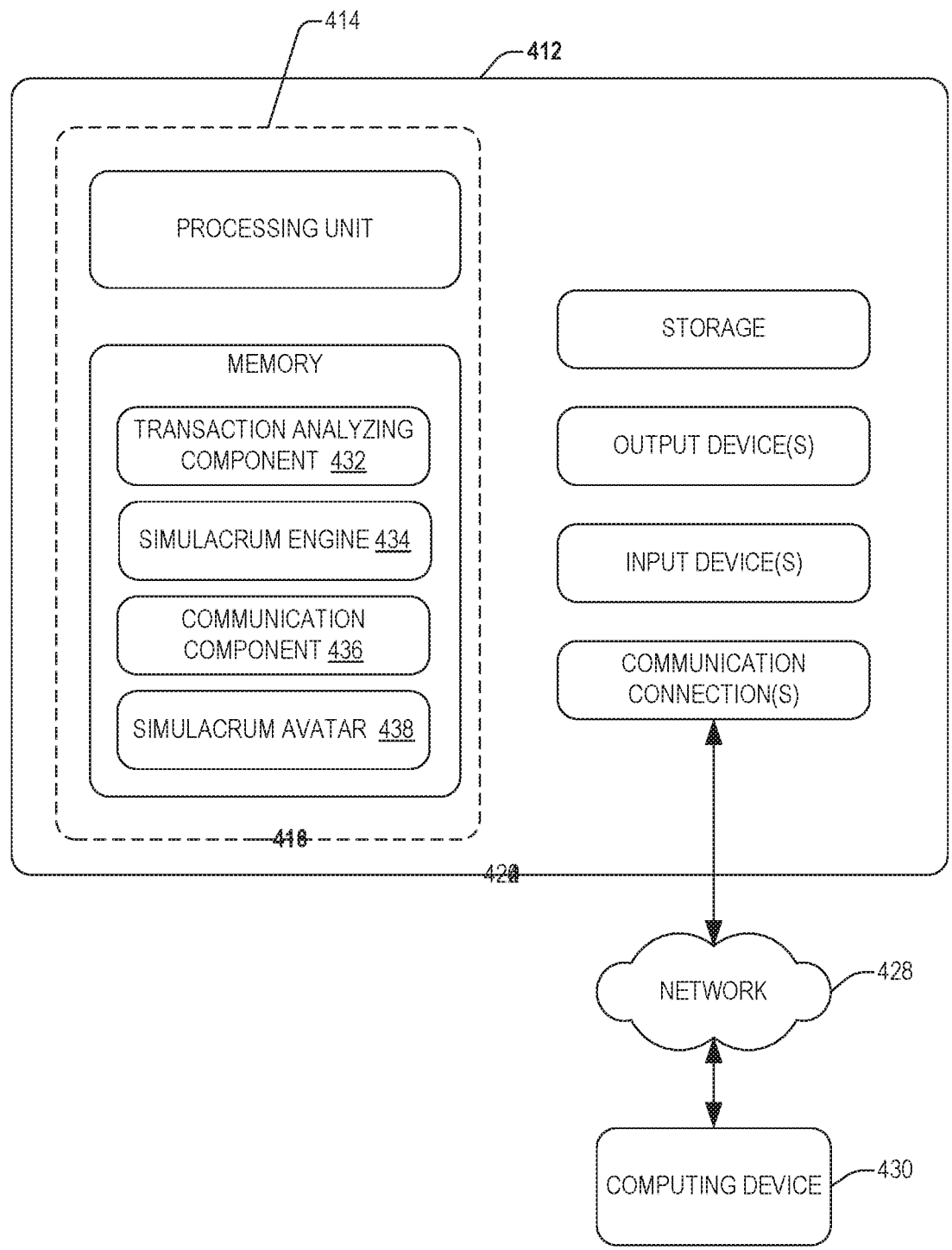
FIG. 4 illustrates a block diagram of a system having a computing device that performs contextual user authentication and control according to one or more embodiments.

FIG. 4 and the following discussion provide a description of a suitable computing environment to implement embodiments of one or more of the provisions set forth herein. The operating environment of FIG. 4 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 4 illustrates a system 400 including a computing device 412 configured to implement one or more embodiments provided herein. In one configuration, computing device 412 includes at least one processing unit 316 and memory 418. Depending on the exact configuration and type of computing device, memory 418 may be volatile, such as RAM, non-volatile, such as ROM, flash memory, etc., or a combination of the two. This configuration is illustrated in FIG. 4 by dashed line 414.

In other embodiments, device 412 includes additional features or functionality. For example, device 412 may include additional storage such as removable storage or non-removable storage, including, but not limited to, magnetic storage, optical storage, etc. Such additional storage is illustrated in FIG. 4 by storage 3420. In one or more embodiments, computer readable instructions to implement one or more embodiments provided herein are in storage 420. Storage 420 may store other computer readable instructions to implement an operating system, an application program, etc. Computer readable instructions may be loaded in memory 418 for execution by processing unit 416, for example.

The term "computer readable media" as used herein includes computer storage media. Computer storage media includes volatile and nonvolatile, removable and non-removable media implemented in any method or technology for storage of information such as computer readable instructions or other data. Memory 418 and storage 420 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 412. Any such computer storage media is part of device 412.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 412 includes input device(s) 424 such as keyboard, mouse, pen, voice input device, touch input device, infrared cameras, video input devices, or any other input device. Output device(s) 422 such as one or more displays, speakers, printers, or any other output device may be included with device 412. Input device(s) 424 and output device(s) 422 may be connected to device 412 via a wired connection, wireless connection, or any combination thereof. In one or more embodiments, an input device or an output device from another computing device may be used as input device(s) 424 or output device(s) 422 for computing device 412. Device 412 may include communication connection(s) 426 to facilitate communications via a network 428 with one or more other computing devices 430.

Certain functionalities can be performed by software applications resident in memory 418, such as a transactional analyzing component 432, simulacrum engine 434, communications monitoring component 436, and a simulacrum avatar 438.

Figure 5:
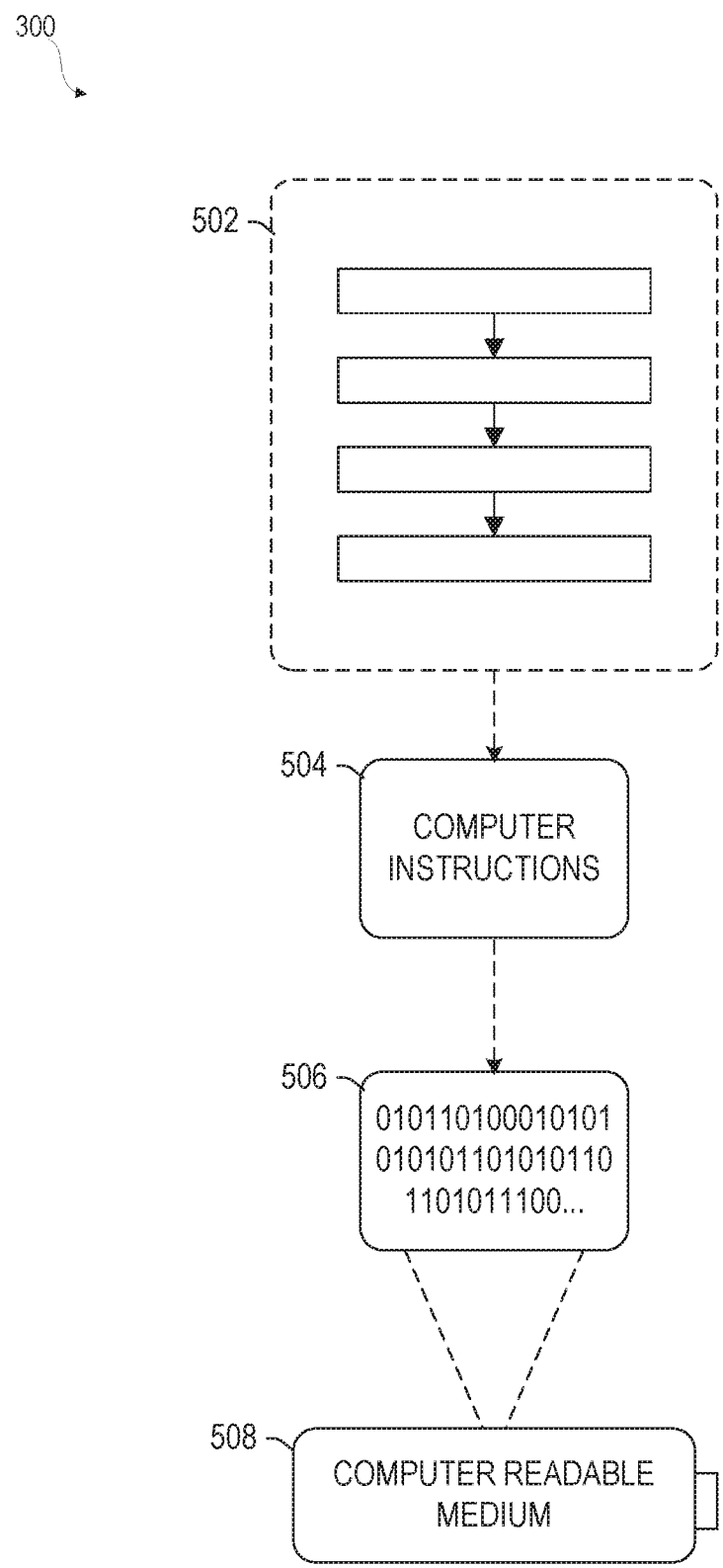
FIG. 5 illustrates a block diagram of example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 304 may be configured to perform a method 502, such as method 600 of FIG. 6. In another embodiment, the processor-executable instructions 504 may be configured to implement a system, such as the system 400 of FIG. 4. Many such computer-readable media may be devised by those of ordinary skill in the art that are configured to operate in accordance with the techniques presented herein.

Figure 6:
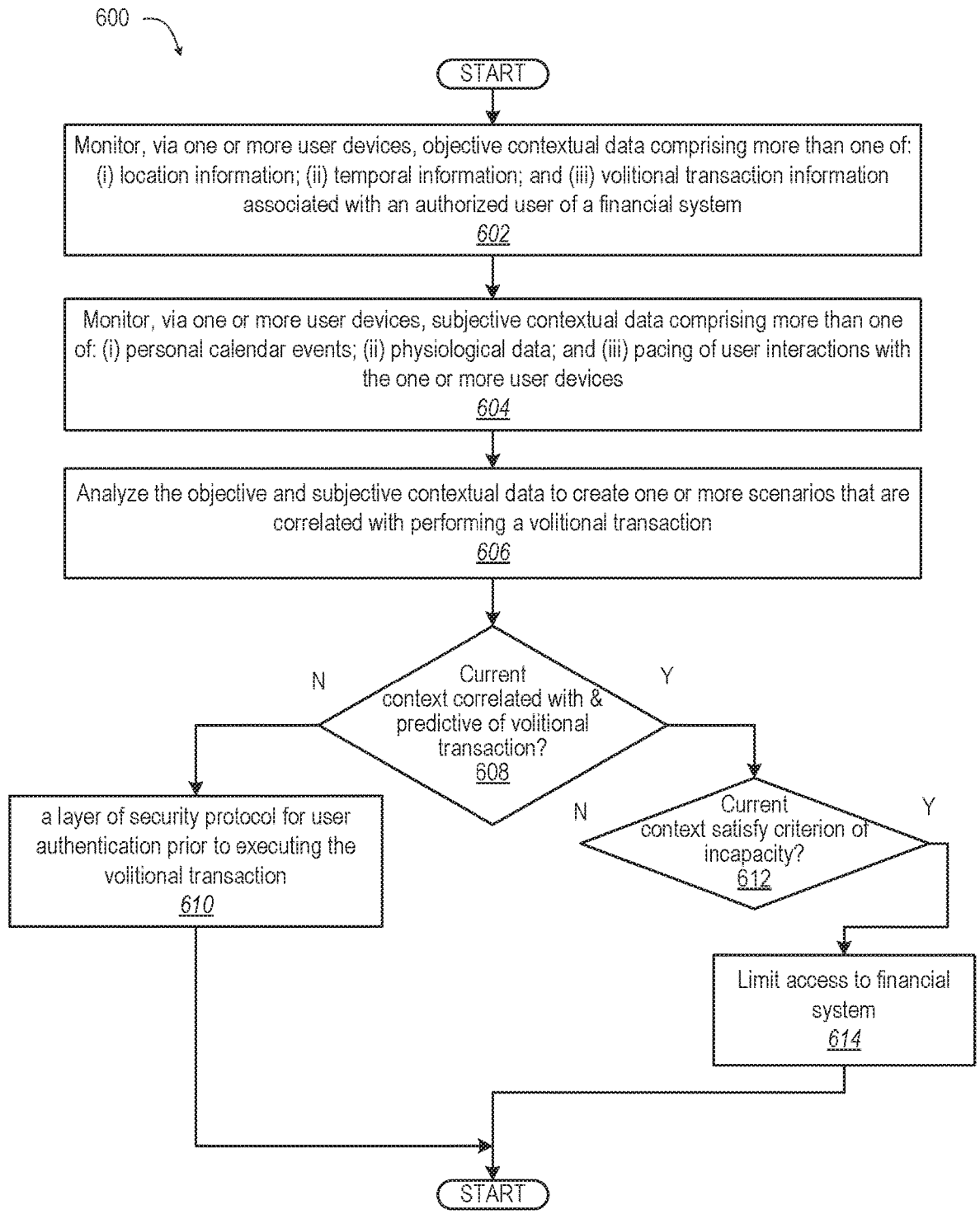
FIG. 6 illustrates a flow diagram of a method of contextually predicting behavior of a human operator and controlling financial transactions, according to one or more embodiments.

FIG. 6 illustrates a method 600 of contextual inferring capacity for triggering a financial transaction. In one or more embodiments, the method 600 begins monitoring, via one or more user devices, objective contextual data comprising more than one of: (i) location information; (ii) temporal information; and (iii) volitional transaction information associated with an authorized user of a financial system (block 602). Method 600 includes monitoring, via one or more user devices, subjective contextual data comprising more than one of: (i) personal calendar events; (ii) physiological data; and (iii) pacing of user interactions with the one or more user devices (block 604). Method 600 includes analyzing the objective and subjective contextual data to create one or more scenarios that are correlated with performing a volitional transaction (block 606). Method 600 includes determining whether a current context is one of the one or more scenarios that is correlated with and predictive of the volitional transactional information (decision block 608). In response to determining that the current context is not predictive a volitional transaction, method 600 includes adding a layer of security protocol for user authentication prior to executing the volitional transaction (block 610). Then method 600 ends. In response to determining that the current context is predictive of a volitional transaction in decision block 608, method 600 includes determining whether the subjective contextual data satisfies at least one criterion for incapacity to perform a volitional transaction (decision block 612). In response to determining an incapacity to perform the volitional transaction, method 600 includes limiting access to the financial system (block 614). Then method 600 ends. In response to not determining an incapacity to perform the volitional transaction in decision block 612, method 600 ends.

In one or more embodiments, the criterion for incapacity is intoxication; and method 600 includes limiting access to the financial system by: (i) presenting a cognitive sobriety test via at least one user device; and (ii) preventing access to the financial system in response to failing the cognitive sobriety test.

In one or more embodiments, the criterion for incapacity is emotional agitation. Method 600 includes limiting access to the financial system by blocking at least one category of financial transaction associated with a policy having a condition precedent of being in a rational state of mind. In a particular embodiments, the criterion further includes detecting a third party who is at least one of: (i) verbally interacting with the authorized user; and (ii) maintaining close proximity to the authorized user indicative of the authorized user being under duress. Method 600 includes limiting access to the financial system by: (i) presenting on a user interface execution of the financial transaction; and (ii) placing a provisional hold on actual completion of the financial transaction for a period of time.

In one or more embodiments, the criterion for incapacity is emotional agitation. Method 600 includes limiting access to the financial system by blocking at least one category of financial transaction having a condition precedent of being in a rational state of mind.

In one or more embodiments, the criterion for incapacity comprises emotional agitation. Method 600 includes limiting access to the financial system by: (i) blocking an advertisement, via the one or more user devices, that has a correlation with causing additional agitation to the authorized user; and (ii) presenting another advisement, via the one or more user devices, that has a correlation with soothing the emotional agitation of the authorized user.

In one or more embodiments, method 600 includes: (i) monitoring the pacing of user interactions with the one or more user devices comprises determining a baseline pacing of user interactions; and (ii) determining whether the subjective contextual data satisfies the at least one criterion for incapacity comprises determining whether a current pacing is below a threshold fraction of the baseline pacing. In a particular embodiment, the criterion for incapacity is emotional agitation. Method 600 includes limiting access to the financial system by: (i) blocking an advertisement, via the one or more user devices, that has a correlation with causing additional agitation to the authorized user; and (ii) presenting another advisement, via the one or more user devices, that has a correlation with soothing the emotional agitation of the authorized user.

According to aspects of the present innovation, behavioral analysis is provided for smart devices that leverages the fact that everyone has a unique communication footprint. The information gleaned therefrom can be used for fraud prevention, authentication, creation of user profiles, and adjusting smart device behavior for different individuals. For example, a smart device might attempt to get an "emotional read" on a person. Based on knowing when the person is upset or tired, the system adjusts smart device behavior or marketing messages accordingly.

In one or more aspects, a smart agent (or virtual assistant) acts in a more sophisticated manner by incorporating context into actions performed on behalf of a user. Using context for fraud prevention, authentication improves services performed by the smart agent on behalf of a user and can provide more effective marketing messages.

According to aspects of the present innovation, a smart agent acts in a more sophisticated manner by incorporating context into actions performed on behalf of a user, as would an actual human being. For example, a smart agent might perform an analysis over the course of weeks or months to determine certain traits associated with the user.

In an illustrative example, a smart agent can determine the following traits: (i) The user habitually calls a relative each Sunday night; (ii) The user tends to pay bills each Thursday evening; (iii) The user tends to access television listing information at the "tvlistings.com" website when the television is first turned on; (iv) the user tends to become angry when talking to a particular person or when a particular topic is discussed.

Based on such contextual learning, the system can perform authentication. If the user does not perform a task he or she normally performs on Sunday evenings (e.g., calling a relative), the smart agent might require additional authentication credentials to ensure that the user is the authorized user As another example, the system can provide fraud prevention. If the user attempts to pay bills at an unusual time (e.g., other than on Thursday evening), further authentication could be required before granting access to financial information As an additional example, the system can provide services related to context. When the smart agent determines, based its audio sensors, that the television was just turned on, the smart agent might automatically provide television listing information from the tvlistings.com website.

As a further example, the system can provide enhanced marketing. When the smart agent determines that the user is angry or emotional, the smart agent might refrain from presenting marketing messages. By benefit of the present disclosure, contextual learning is used to determine behaviors or traits for authentication, and fraud prevention. Use of determined emotions can better leverage marketing content for appropriate situations.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for contextual inferring capacity for triggering a financial transaction, the method comprising:
monitoring and collecting, via one or more user devices, objective contextual data comprising more than one of: (i) location information; (ii) temporal information; and (iii) volitional transaction information associated with an authorized user of a financial system;
monitoring and collecting, via one or more user devices, subjective contextual data comprising more than one of: (i) personal calendar events; (ii) physiological data; and (iii) pacing of user interactions with the one or more user devices;
analyzing the collected objective and subjective contextual data;
creating a predictive model based at least in part on the analysis of the objective contextual data and the subjective contextual data;
generating one or more scenarios correlated with and predictive of a volitional transaction of the user via the predictive model;
determining whether a current context is one of the one or more scenarios that is correlated with and predictive of the volitional transactional information;
in response to determining that the current context is not predictive of a volitional transaction, adding a layer of security protocol for user authentication prior to executing the volitional transaction; and
in response to determining that the current context is predictive of a volitional transaction:
determining whether the subjective contextual data satisfies at least one predetermined criterion for incapacity to perform a volitional transaction; and
in response to determining an incapacity to perform the volitional transaction, limiting access to the financial system.

2. The method of claim 1, wherein:
the criterion for incapacity comprises intoxication; and
limiting access to the financial system comprises:
presenting a cognitive sobriety test via at least one user device; and
preventing access to the financial system in response to failing the cognitive sobriety test.

3. The method of claim 1, wherein:
the criterion for incapacity comprises emotional agitation; and
limiting access to the financial system comprises blocking at least one category of financial transaction associated with a policy having a condition precedent of being in a rational state of mind.

4. The method of claim 3, wherein:
the criterion further comprises detecting a third party who is at least one of: (i) verbally interacting with the authorized user; and (ii) maintaining close proximity to the authorized user indicative of the authorized user being under duress; and
limiting access to the financial system comprises:
presenting on a user interface execution of the financial transaction; and
placing a provisional hold on actual completion of the financial transaction for a period of time.

5. The method of claim 1, wherein:
limiting access to the financial system comprises not authorizing large banking transactions.

6. The method of claim 1, wherein:
the criterion for incapacity comprises emotional agitation; and
limiting access to the financial system comprises:
blocking an advertisement, via the one or more user devices, that has a correlation with causing additional agitation to the authorized user; and
presenting another advisement, via the one or more user devices, that has a correlation with soothing the emotional agitation of the authorized user.

7. The method of claim 1, wherein:
monitoring the pacing of user interactions with the one or more user devices comprises determining a baseline pacing of user interactions; and
determining whether the subjective contextual data satisfies the at least one criterion for incapacity comprises determining whether a current pacing is below a threshold fraction of the baseline pacing.

8. The method of claim 7, wherein:
the criterion for incapacity comprises emotional agitation; and
limiting access to the financial system comprises:
blocking an advertisement, via the one or more user devices, that has a correlation with causing additional agitation to the authorized user; and
presenting another advisement, via the one or more user devices, that has a correlation with soothing the emotional agitation of the authorized user.

9. A system comprising:
at least one sensor that captures contextual information of a user configured to communicate with an objective contextual monitoring component and a subjective contextual monitoring component;
wherein the objective contextual monitoring component is in communication with a one or more user devices to receive objective contextual data comprising more than one of: (i) location information; (ii) temporal information; and (iii) volitional transaction information associated with an authorized user of a financial system;
wherein the subjective contextual monitoring component is in communication with the one or more user devices to receive subjective contextual data comprising more than one of: (i) personal calendar events; (ii) physiological data; and (iii) pacing of user interactions with the one or more user devices;
wherein at least some of either the objective contextual data or the subjective contextual data is from the at least one sensor;
a contextual analyzing component that receives the objective and subjective contextual data to create one or more scenarios that are correlated with the user performing a volitional transaction;
a predictive engine that determines whether a current context is one of the one or more scenarios that is correlated with and predictive of the volitional transactional information; and
a financial transaction controller that:
in response to determining that the current context is not predictive of a volitional transaction, adds a layer of security protocol for user authentication prior to executing the volitional transaction; and
in response to determining that the current context is predictive of a volitional transaction:
determining whether the subjective contextual data satisfies at least one criterion for incapacity to perform a volitional transaction; and
in response to determining an incapacity to perform the volitional transaction, limiting access to the financial system.

10. The system of claim 9, wherein:
the criterion for incapacity comprises intoxication; and
limiting access to the financial system comprises:
- presenting a cognitive sobriety test via at least one user device; and
- preventing access to the financial system in response to failing the cognitive sobriety test.

11. The system of claim 9, wherein:
the criterion for incapacity comprises emotional agitation; and
limiting access to the financial system comprises blocking at least one category of financial transaction associated with a policy having a condition precedent of being in a rational state of mind.

12. The system of claim 11, wherein:
the criterion further comprises detecting a third party who is at least one of: (i) verbally interacting with the authorized user; and (ii) maintaining close proximity to the authorized user indicative of the authorized user being under duress; and
limiting access to the financial system comprises:
- presenting on a user interface execution of the financial transaction; and
- placing a provisional hold on actual completion of the financial transaction for a period of time.

13. The system of claim 9, wherein:
limiting access to the financial system comprises not authorizing large banking transactions.

14. The system of claim 9, wherein:
the criterion for incapacity comprises emotional agitation; and
limiting access to the financial system comprises:
- blocking an advertisement, via the one or more user devices, that has a correlation with causing additional agitation to the authorized user; and
- presenting another advisement, via the one or more user devices, that has a correlation with soothing the emotional agitation of the authorized user.

15. The system of claim 9, wherein:
monitoring the pacing of user interactions with the one or more user devices comprises determining a baseline pacing of user interactions; and
determining whether the subjective contextual data satisfies the at least one criterion for incapacity comprises determining whether a current pacing is below a threshold fraction of the baseline pacing.

16. The system of claim 15, wherein:
the criterion for incapacity comprises emotional agitation; and
limiting access to the financial system comprises:
- blocking an advertisement, via the one or more user devices, that has a correlation with causing additional agitation to the authorized user; and
- presenting another advisement, via the one or more user devices, that has a correlation with soothing the emotional agitation of the authorized user.

17. A non-transitory computer-readable storage medium comprising computer-executable instructions, which when executed via a processing unit on a computer performs acts, comprising:
- monitoring and collecting, via one or more user devices, objective contextual data comprising more than one of: (i) location information; (ii) temporal information; and (iii) volitional transaction information associated with an authorized user of a financial system;
- monitoring and collecting, via one or more user devices, subjective contextual data comprising more than one of: (i) personal calendar events; (ii) physiological data; and (iii) pacing of user interactions with the one or more user devices;
- analyzing the objective and subjective contextual data;
- creating a predictive model based on least in part on the analysis of the objective contextual data and the subjective contextual data;
- generating one or more scenarios correlated with and predictive of a volitional transaction of the user via the predictive model;
- determining whether a current context is one of the one or more scenarios that is correlated with and predictive of the volitional transactional information;
  - in response to determining that the current context is not predictive of a volitional transaction, adding a layer of security protocol for user authentication prior to executing the volitional transaction; and
- in response to determining that the current context is predictive of a volitional transaction:
  - determining whether the subjective contextual data satisfies at least one criterion for incapacity to perform a volitional transaction; and
  - in response to determining an incapacity to perform the volitional transaction, limiting access to the financial system.

18. The computer-readable storage medium of claim 17, wherein:
the criterion for incapacity comprises intoxication; and
limiting access to the financial system comprises:
- presenting a cognitive sobriety test via at least one user device; and
- preventing access to the financial system in response to failing the cognitive sobriety test.

19. The computer-readable storage medium of claim 18, wherein limiting access to the financial system comprises authorizing costs for transportation for the user while blocking at least one other category of financial transaction.

20. The computer-readable storage medium of claim 17, wherein limiting access to the financial system comprises not authorizing large banking transactions.

* * * * *